(12) United States Patent
Ike et al.

(10) Patent No.: US 11,518,375 B2
(45) Date of Patent: Dec. 6, 2022

(54) COLLISION AVOIDANCE ASSIST CONTROL APPARATUS

(71) Applicant: TOYOTA JIDOSHA KABUSHIKI KAISHA, Toyota (JP)

(72) Inventors: Wataru Ike, Nagoya (JP); Yuma Hoshikawa, Nagoya (JP); Ryota Murakami, Toyota (JP); Yuto Shimbo, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 209 days.

(21) Appl. No.: 17/016,567

(22) Filed: Sep. 10, 2020

(65) Prior Publication Data
US 2021/0155232 A1    May 27, 2021

(30) Foreign Application Priority Data

Nov. 22, 2019    (JP) ............................. JP2019-211373

(51) Int. Cl.
| | |
|---|---|
| *B60W 30/09* | (2012.01) |
| *B60W 30/095* | (2012.01) |
| *B60W 50/08* | (2020.01) |
| *B60W 10/18* | (2012.01) |
| *B60W 10/20* | (2006.01) |
| *G06V 20/58* | (2022.01) |

(52) U.S. Cl.
CPC ............ *B60W 30/09* (2013.01); *B60W 10/18* (2013.01); *B60W 10/20* (2013.01); *B60W 30/0956* (2013.01); *B60W 50/087* (2013.01); *G06V 20/58* (2022.01); *B60W 2540/106* (2013.01); *B60W 2540/18* (2013.01); *B60W 2554/80* (2020.02)

(58) Field of Classification Search
None
See application file for complete search history.

(56) References Cited

U.S. PATENT DOCUMENTS

| | | | |
|---|---|---|---|
| 9,105,190 | B2 | 8/2015 | Akiyama |
| 9,393,960 | B2 | 7/2016 | Kodaira |
| 9,405,727 | B2 | 8/2016 | Nagata |
| 9,483,945 | B2 | 11/2016 | Okita et al. |
| 9,669,760 | B2 | 6/2017 | Hanita et al. |
| 9,873,412 | B2 | 1/2018 | Moriizumi |
| 9,898,929 | B2 | 2/2018 | Harada et al. |
| 9,965,955 | B2 | 5/2018 | Fujishiro |

(Continued)

FOREIGN PATENT DOCUMENTS

| | | | | |
|---|---|---|---|---|
| JP | 2012-121534 A | * | 6/2012 | ............ B60W 30/09 |
| JP | 2012-121534 A | | 6/2012 | |

*Primary Examiner* — Sze-Hon Kong
*Assistant Examiner* — Ana D Thomas
(74) *Attorney, Agent, or Firm* — Sughrue Mion, PLLC

(57) ABSTRACT

When a driving assist ECU determines that a mistaken pedal operation has occurred, it starts an automatic brake control, and thereafter, ends the automatic brake control when a steering operation rate ω is greater than a threshold ωf (ω>ωf). Whereas, when the ECU determines that the mistaken pedal operation has not occurred, it performs a steering override control and does not perform the automatic brake control, when a steering operation amount θ is greater than a threshold θe or when the steering operation rate ω is greater than the threshold.

2 Claims, 5 Drawing Sheets

(56) References Cited

U.S. PATENT DOCUMENTS

| | | |
|---|---|---|
| 10,793,147 B2 | 10/2020 | Kaminade et al. |
| 10,946,830 B2 | 3/2021 | Sawai et al. |
| 11,175,673 B2 | 11/2021 | Eshima |
| 2019/0286127 A1* | 9/2019 | Watanabe .............. B62D 6/008 |

* cited by examiner

COLLISION AVOIDANCE ASSIST CONTROL APPARATUS

TECHNICAL FIELD

The present disclosure relates to a collision avoidance assist control apparatus configured to perform an automatic brake control so as to avoid a collision between a host vehicle and an obstacle.

BACKGROUND

There has been a known collision avoidance assist control apparatus configured to:
  detect an obstacle having a probability (or high possibility, a collision possibility) of a collision with a host vehicle, using a forward obstacle detection sensor such as a camera sensor and a radar sensor; and
  perform an automatic brake control so as to avoid the collision, when the obstacle having the high collision possibility is detected.

The automatic brake control is a control to generate brake force applied to the host vehicle so as to automatically decelerate the host vehicle at a predetermined deceleration.

It is preferable for the automatic brake control to be carried out when a driver of the host vehicle does not perform a collision avoidance operation. In view of this, an apparatus (hereinafter referred to as a conventional apparatus) proposed in Japanese Patent Application Laid-Open (kokai) No. 2012-121534 is configured to a so-called override control. The override control is a control to prioritize driver's operation to avoid the collision between the host vehicle and the obstacle over the automatic brake control, when the driver's operation is detected in a case where the automatic brake control is supposed to be carried out (namely, where the host vehicle has a probability (high possibility) of colliding with the obstacle).

For instance, the conventional apparatus is configured to prioritize the driver's brake operation over the automatic brake control (i.e., perform the override control) by prohibiting the automatic brake control, when a brake operation amount of the driver is greater than a threshold.

Meanwhile, the conventional apparatus is configured to:
  determine that a mistaken pedal operation has performed, when an acceleration pedal operation amount is greater than a threshold and a change rate in the acceleration pedal operation amount (or acceleration pedal operation rate) is greater than a threshold, the mistaken pedal operation being an operation that the driver mistakenly presses/depresses the acceleration pedal instead of the brake pedal despite that the driver intends to press the brake pedal; and
  execute the automatic brake control without performing the override control when it is determined that the mistaken pedal operation has occurred/performed.

In addition, the conventional apparatus is configured to:
  determine that the driver is trying to avoid the collision by a steering operation of the driver when a steering operation amount is greater than a threshold; and
  prohibit the automatic brake control by performing the override control, when it is determined that the driver is trying to avoid the collision by the steering operation.

SUMMARY

The conventional apparatus always carries out the automatic brake control (in other words, does not perform the override control), when it is determined that the mistaken pedal operation has occurred in the case where the host vehicle has a probability (high possibility) of colliding with the obstacle, without taking into consideration of the other driving operating state by the driver. However, there may be cases where the automatic brake control should not be carried out, depending on some of the driving operating states by the driver.

For instance, there may be a case where the driver steers a steering wheel while he/she is pressing strongly/rapidly the acceleration pedal with his/her intention in order to avoid the collision with the obstacle. In this case, if it is determined that the mistaken pedal operation has occurred, and therefore, the automatic brake control is performed, the automatic brake control may interfere with the driver's operation to avoid the collision (i.e., the collision avoidance operation).

As understood from the above, the conventional apparatus has a room for improving the condition(s) to execute the override control in a state where there is a probability of the collision between the host vehicle and the obstacle.

The present disclosure is made to cope with the problems. One of the objectives of the present disclosure is to provide a collision avoidance assist control apparatus that is capable of appropriately performing the override control in the state where there is the probability of the collision between the host vehicle and the obstacle.

In some embodiments of the present disclosure, the collision avoidance assist control apparatus for a host vehicle comprises:
  a brake device configured to generate brake force applied to the host vehicle in accordance with (in response to) a brake pedal operation of a driver (20, 21, 22);
  a surrounding area detection sensor (or at least a front direction detection sensor) configured to obtain information on an object (or object information) that is present around a host vehicle (50, 60); and
  a control unit configured to:
    determine whether or not there is a probability of a collision between said host vehicle and an object (or a probability that the host vehicle collides with an object) based on the information obtained by the surrounding area detection sensor;
    perform an automatic brake control to let the brake device generate the brake force applied to the host vehicle without requiring the brake pedal operation of the driver, so as to avoid the collision, when it is determined that there is the probability (11, 13); and
    perform a steering override control to determine whether or not a steering operation index value indicative of (relating to) steering operation of the driver satisfies a steering override condition, and to prohibit the automatic brake control from being performed when it is determined that the steering operation index value satisfies the steering override condition (15).

The control unit is further configured to:
  determine whether or not an acceleration operation index value indicative of (relating to) acceleration pedal operation of the driver satisfies a mistaken pedal operation determining condition;
  determines that a mistaken pedal operation has occurred when it is determined that the acceleration operation index value satisfies the mistaken pedal operation determining condition, the mistaken pedal operation being an operation that the driver mistakenly operates/presses an acceleration pedal despite that the driver intends to operate/presses the brake pedal; and use a strict requirement (S18) as the steering override condition when it is determined that the mistaken pedal operation has occurred and use a mild requirement (S14) as the steering override condition when it is not determined that the mistaken pedal operation has occurred, wherein the strict requirement is harder (is set to be unlikely) to be satisfied by the steering operation index value than the mild requirement.

In the above embodiment, it can be expressed that the collision avoidance assist control apparatus for the host vehicle comprises:

a brake device configured to generate brake force to the host vehicle in accordance with (in response to) a brake pedal operation of a driver (20, 21, 22);

an obstacle detecting section/sensor configured to detect an obstacle around (in the vicinity of) the host vehicle (50, 60);

an automatic brake control section (11, 13) configured to perform an automatic brake control to let the brake device generate the brake force applied to the host vehicle even when there is no brake pedal operation of the driver, so as to avoid the collision between the host vehicle and an obstacle detected by the obstacle detecting section, when it is determined that there is a probability (or a high possibility) of the collision; and a steering override control section (15) configured to perform a steering override control to determine whether or not a steering operation index value indicative of (relating to) steering operation of the driver satisfies a steering override condition, and to prohibit the automatic brake control from being performed when it is determined that the steering operation index value satisfies the steering override condition.

The collision avoidance assist control apparatus further comprises a mistaken pedal operation determining section (16) configured to:

determine whether or not an acceleration operation index value indicative of (relating to) acceleration pedal operation of the driver satisfies a predetermined mistaken pedal operation determining condition;

determine/infer that a mistaken pedal operation has occurred when it is determined that the acceleration operation index value satisfies the mistaken pedal operation determining condition, the mistaken pedal operation being an operation that the driver mistakenly operates an acceleration pedal despite that the driver intends to operate the brake pedal.

In this embodiment, the steering override control section (15) is configured to perform the steering override control (S16) when it is determined that the steering operation index value satisfies the steering override condition (S14: ON, S18: ON) that is set so as to let the automatic brake control become harder to be prohibited when it is determined/inferred that the mistaken pedal operation has occurred than when it is not determined/inferred that the mistaken pedal operation has occurred, in both cases where it is determined/inferred that the mistaken pedal operation has occurred and where it is not determined/inferred that the mistaken pedal operation has occurred.

In some embodiments, the collision avoidance assist control apparatus for the host vehicle according to the present disclosure comprises the brake device, the obstacle detecting section/sensor, the automatic brake control section, and the steering override control section. The brake device generates the brake force applied to the host vehicle (e.g., a torque to stop the rotation of each of wheels of the host vehicle) in accordance with (in response to) the brake pedal operation of the driver. For instance, the brake device uses a brake oil pressure to generate the brake force that varies depending on the brake pedal operation.

The obstacle detecting section/sensor detects the obstacle that is present at a location near (e.g., ahead of) the host vehicle.

The automatic brake control section performs the automatic brake control to let the brake device generate the brake force applied to the host vehicle without requiring the brake pedal operation of the driver, so as to avoid the collision between the host vehicle and the obstacle, when it is determined that there is the probability of the collision.

The steering override control section determines whether or not the steering operation index value indicative of (relating to) steering operation of the driver satisfies the steering override condition. The steering override control section performs the steering override control to prohibit the automatic brake control from being performed when it is determined that the steering operation index value satisfies the steering override condition. The steering operation index value may include a steering operation amount (e.g., a steering angle) and a steering operation rate (e.g., a change amount in the steering angle per unit time).

The steering override condition is set to be a condition to be satisfied when it is inferred/determined that the steering operation is carried out by the driver of the host vehicle to avoid the collision between the host vehicle and the obstacle. Therefore, the automatic brake control is prohibited from being executed in a case where it is inferred that the driver of the host vehicle has operated the steering operation to avoid the collision between the host vehicle and the obstacle, since the steering override condition becomes satisfied in this case. In other words, the driver's steering operation to avoid the collision is given priority over the automatic brake control, so that the automatic brake control is prohibited.

In order for the steering override control section to prohibit the execution of the automatic brake control, the steering override control section either ends the automatic brake control when the automatic control is being executed or prohibits the automatic brake control from being started when the automatic control is not being executed.

Accordingly, for example, when the driver has performed the steering operation with his/her intention to avoid the collision, the automatic brake control is not executed. Therefore, the driver can accelerate the vehicle to perform the collision avoidance operation as intended.

The acceleration pedal operation is not necessarily performed according to the driver's intention. For example, the driver may mistakenly press the acceleration pedal strongly immediately after he/she notices the obstacle in front of the host vehicle.

In view of the above, the collision avoidance assist control apparatus for the host vehicle according to the present disclosure comprises the mistaken pedal operation determining section.

The mistaken pedal operation determining section, determines whether or not the acceleration operation index value indicative of (correlating with) the driver's acceleration pedal operation satisfies the predetermined mistaken pedal operation determining condition; and determines/infers that the mistaken pedal operation has occurred when it is determined that the acceleration operation index value satisfies the mistaken pedal operation determining condition. The mistaken pedal operation is the operation that the driver mistakenly operates/presses the acceleration pedal despite that he/she intends to operate/press the brake pedal.

For instance, the acceleration operation index value may include an acceleration pedal operation amount and an acceleration pedal operation rate (e.g., a change amount in the acceleration pedal operation amount per unit time).

For example, a rapid pressing operation of the acceleration pedal is considered/regarded as the mistaken pedal operation.

When it is determined/inferred that the mistaken pedal operation has performed/occurred, the driver may be in a panic mode. Thus, it is preferable that the automatic brake control be not prohibited when it is determined/inferred that the mistaken pedal operation has occurred in a case where the obstacle has been detected. However, there may be cases where the automatic brake control should not be executed, depending on the driver's driving operation states. For instance, there may be a case the driver operates the steering wheel while he/she is strongly pressing the acceleration pedal, so as to avoid the collision with the obstacle. In such cases, there may be an occasion where the driver's acceleration pedal operation is wrongly/improperly determined to be the mistaken pedal operation. If this happens and thus the automatic brake control is performed, the automatic brake control may interfere with the driver's collision avoidance operation.

In view of the above, in the case where it is determined/inferred that the mistaken pedal operation has occurred, the steering override control section uses a condition, as the steering override condition, that is set so as to let the automatic brake control become harder to be prohibited when it is determined/inferred that the mistaken pedal operation has occurred than when it is not determined/inferred that the mistaken pedal operation has occurred. The steering override control section performs the steering override control when it is determined that the steering operation index value satisfies the steering override condition, in both cases where it is determined/inferred that the mistaken pedal operation has occurred and where it is not determined/inferred that the mistaken pedal operation has occurred.

The thus configured collision avoidance assist control apparatus can perform the steering override control more appropriately even when it is it is determined/inferred that the mistaken pedal operation has occurred.

In some embodiments, the steering override control section (i.e., the control unit):

(1) in a state where it is not determined that the mistaken pedal operation has occurred,
  performs the steering override control (by) using a first steering override determining condition as the steering override condition when the automatic brake control has not been started yet (S14),
  performs the steering override control (by) using a second steering override determining condition as the steering override condition when the automatic brake control has already started (S18);

(2) in a state where it is determined that the mistaken pedal operation has occurred,
  does not start performing (or is unable to perform) the steering override control when the automatic brake control has not been started yet (S17: No); and
  performs the steering override control (by) using the second steering override determining condition as the steering override condition when the automatic brake control has already been started.

In this embodiment, in the state where it is not determined that the mistaken pedal operation has occurred,
  the first steering override determining condition is used as the steering override condition, when the automatic brake control has not been started yet, so as to perform the steering override control; and
  the second steering override determining condition is used as the steering override condition, when the automatic brake control has already started, so as to perform the steering override control.

In other words, in the state where it is not determined that the mistaken pedal operation has occurred, the control unit
  performs the steering override control when the steering operation index value satisfies the first steering override determining condition before the automatic brake control has started; and
  performs the steering override control when the steering operation index value satisfies the second steering override determining condition after the automatic brake control has started.

Performing the steering override control in the case where the automatic brake control has not been started yet means prohibiting the automatic brake control from being started.

Performing the steering override control in the case where the automatic brake control has already been started means ending/terminating the automatic brake control.

Whereas, in the state where it is determined that the mistaken pedal operation has occurred,
  the steering override control is not performed (or is prohibited from being started), when the automatic brake control has not been started yet; and
  the second steering override determining condition is used as the steering override condition, when the automatic brake control has already started, so as to perform the steering override control.

In other words, in this embodiment, the steering override determining condition used when the automatic brake control has not been started yet and when it is not determined that the mistaken pedal operation has occurred is set to be a condition that makes the automatic brake control is harder (more unlikely) to be prohibited, as compared to the steering override determining condition used when the automatic brake control has not been started yet and when it is determined that the mistaken pedal operation has occurred.

In some embodiments, the first steering override determining condition is a condition to be satisfied, when one of a condition that the a steering operation amount which is the steering operation index value is greater than a steering operation amount threshold and a condition that a steering operation rate which is the steering operation index value is greater than a steering operation rate threshold. Also, in the embodiment, the second steering override determining condition is a condition to be satisfied, when the condition that the steering operation rate is greater than the steering operation rate threshold. However, the second steering override determining condition is not satisfied when the condition that the steering operation amount is greater than the steering operation amount threshold.

In this embodiment, the steering override control is executed and thus the automatic brake control is prohibited, when at least one of the two conditions is satisfied, the two conditions including:
  the "condition that the steering operation amount (e.g., the steering angle) is greater than the steering operation amount threshold"; and
  the "condition that the steering operation rate (e.g., the change amount in the steering angle per unit time) is greater than the steering operation rate threshold",
  when the automatic brake control has not been started yet in the situation where it is not determined that the mistaken pedal operation has occurred.

For example, if the steering operation amount is great when the automatic brake control has not been started yet, it can be considered that the driver has already started the collision avoidance operation by himself/herself. Similarly, if the steering operation rate is great when the automatic brake control has not been started yet, it can also be considered that the driver has already started the collision avoidance operation by himself/herself. Thus, in those cases, the automatic brake control is appropriately prohibited.

In the case where it is not determined that the mistaken pedal operation has occurred, and when the automatic brake control has already been started, the steering override control is executed when the steering operation rate is greater than the steering operation rate threshold. Therefore, the automatic brake control is appropriately ended/terminated.

In the case where the steering operation is made at a steering operation rate greater than the steering operation rate threshold after the automatic brake control has already been started, it can be considered that the driver has started the collision avoidance operation by himself/herself. In this case, the automatic brake control is appropriately ended/terminated by executing the steering override control.

Whereas, when the driver has performed the mistaken pedal operation, he/she may be in a panic mode. In view of this, the control unit (or the steering override control section) does not execute the steering override control when the automatic brake control has not been started yet in the situation where the it is determined/inferred that the mistaken pedal operation has performed/occurred. Thus, the automatic brake control is appropriately started in this case.

Whereas, in the case where the driver is trying to avoid the collision by operating the steering wheel, it can be considered that the driver is performing not only the steering operation but also the acceleration pedal operation. In view of this, the steering override control is executed if the steering operation is made at a steering operation rate greater than the steering operation rate threshold even after the automatic brake control has already been started. In this case, the automatic brake control is appropriately ended/terminated by executing the steering override control.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols. Other objects, other features, and attendant advantages of the present disclosure will be readily appreciated from the following description of the embodiments of the disclosure which is made with reference to the accompanying drawings.

DETAILED DESCRIPTION

A collision avoidance assist control apparatus (hereinafter, sometimes referred to as a "present apparatus") according to an embodiment of the present disclosure will be described with reference to the drawings.

Figure 1:
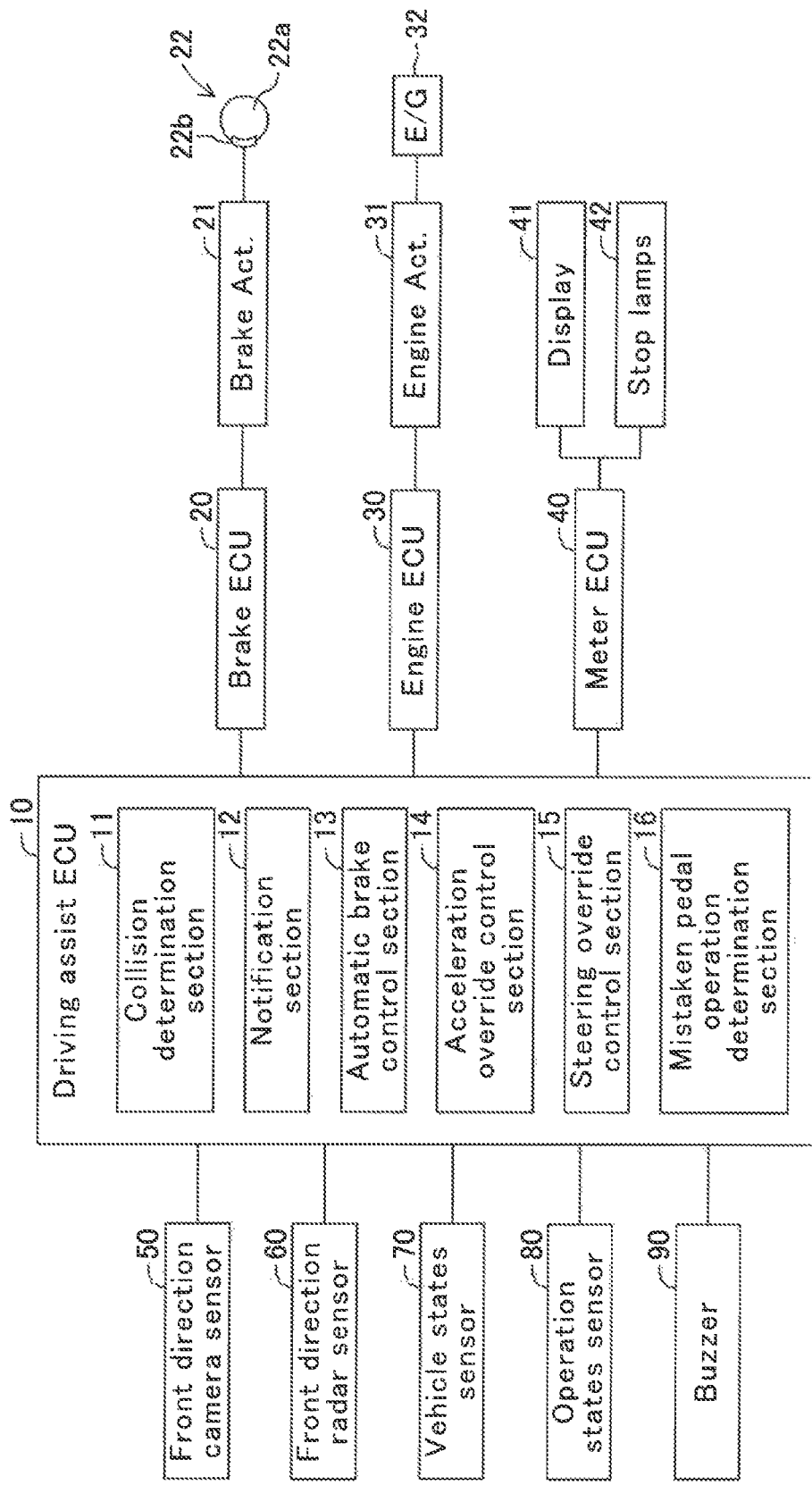
FIG. 1 is a schematic diagram of a collision avoidance assist control apparatus according to an embodiment of the present disclosure.

The present apparatus is applied to a vehicle that is sometimes referred to as a "host vehicle" in order to be distinguished from other vehicles. As shown in FIG. 1, the present apparatus comprises a driving assist ECU 10, a brake ECU 20, an engine ECU 30, and a meter ECU 40.

The ECUs are Electronic Control Units. The ECUs are connected with each other through a CAN (Controller Area Network) so that one of the ECUs can transmit information to and receive information from the other any one of the ECUs. Each of the ECUs comprises, as a main component, a microcomputer that includes a CPU, a ROM, a RAM, a nonvolatile memory, and an interface I/F. The CPU achieves various functions through executing instructions (i.e., programs/routines) stored in the ROM. Some or all of those ECUs may be integrated into a single ECU.

The driving assist ECU 10 is a main control device to perform driving assist controls (or driver assist controls to assist a driver of the host vehicle to drive the host vehicle), and is configured to perform/execute a collision avoidance assist control as one of the driving assist controls.

The collision avoidance assist control is a control to:
alert the driver when an obstacle ahead of the host vehicle is detected, the obstacle being an object having a probability (high collision possibility) of a collision between the host vehicle and the object; and
perform an automatic brake control when the collision possibility becomes higher as compared to the collision possibility of when the alert is started, so as to avoid the collision.

The collision avoidance assist control is generally called a "PCS control (pre-crash safety control)", and thus, hereinafter is sometimes referred to as the "PCS control".

The driving assist ECU 10 is connected with a front direction (forward area) camera sensor 50, a front direction (forward area) radar sensor 60, a vehicle states sensor 70, an operation states sensor 80, and a buzzer 90.

The front direction camera sensor 50 is arranged at an upper part of a front windshield and inside a cabin of the host vehicle, and is configured to take/capture an image (or image data, or a picture) of a scene/area in front of (or ahead of) the host vehicle. The front direction camera sensor 50 is configured to recognize a road marking line such as a white line (or a yellow line) on the road as well as a three dimensional object (or a 3D object) that is present in front of the host vehicle, based on the captured image, and to provide/transmit information on them (i.e., white line information, and 3D object information) to the driving assist ECU 10, every time a predetermined time elapses. The while line information includes information indicative of a shape (e.g., a curvature) of the white line, and information indicative of a relative positional relationship between the white line and the host vehicle (in a road/lane width direction). The 3D object information includes information indicative of a type and a size of the detected 3D object that is present ahead of the vehicle, and information indicative of a relative positional relationship between the 3D object and the host vehicle. The type of the 3D object may be specified based on a machine learning or the like.

The front direction radar sensor 60 is arranged at a center of a front end of a vehicle body of the host vehicle, and is configured to detect a 3D object that is present ahead (in front) of the host vehicle. More specifically, the front direction radar sensor 60 is configured to emit a radar wave (i.e., electrical wave, and referred to as a "millimeter wave") in a millimeter wave band. The 3D object (e.g., an other vehicle, a pedestrian, a bicycle, a building, or the like) that is present within a wave emitted area reflects the emitted millimeter wave. The front direction radar sensor 60 is configured to receive the reflected millimeter wave. The front direction radar sensor 60 is configured to, based on a phase difference between the emitted millimeter wave and the received millimeter wave, a time difference from a time point at which the millimeter wave is emitted to a time point at which the reflected millimeter wave is received, an attenuation rate of the received millimeter wave with respect to the emitted millimeter wave, and the like, obtain a 3D object information (or radar information). The 3D object information includes a distance between the 3D object and the host vehicle, a relative speed of the 3D object with respect to the host vehicle, a relative position (or direction) of the 3D object with respect to the host vehicle. The front direction radar sensor 60 is configured to transmit the 3D object information to the driving assist ECU 10 every time a predetermined time elapses.

The driving assist ECU 10 synthesizes the 3D object information transmitted from the front direction camera sensor 50 and the 3D object information transmitted from the front direction radar sensor 60, so as to obtain more accurate 3D object information.

Hereinafter, the front direction camera sensor 50 and the front direction radar sensor 60 may sometimes be collectively referred to as a "front direction sensor" or a "peripheral/surrounding area detection sensor". It can be said that the peripheral/surrounding area detection sensor is configured to obtain/acquire information on an 3D object that is present around (in the vicinity of) the host vehicle. The 3D object information obtained through the front direction camera sensor 50 and the 3D object information obtained through the front direction radar sensor 60 may sometimes be collectively referred to as "front direction sensor information".

The vehicle states sensor 70 is configured to detect vehicle states (running states) of the host vehicle, and includes, for example, a vehicle speed sensor configured to detect/measure a vehicle speed of the host vehicle, a longitudinal acceleration sensor configured to detect an acceleration of the host vehicle in a front-rear direction, a lateral acceleration sensor configured to detect an acceleration of the host vehicle in a lateral (left-right) direction, and a yaw rate sensor configured to detect a yaw rate of the host vehicle.

The driving operation states sensor 80 is configured to detect driving operation states of the host vehicle performed by the driver of the host vehicle. The driving operation states sensor 80 includes sensors and switches. More specifically, the driving operation states sensor 80 includes an acceleration operation amount sensor configured to detect an operation amount of an acceleration pedal, a brake operation amount sensor configured to detect an operation amount of a brake pedal, a brake switch configured to detect presence or absence of an operation to the brake pedal, a steering angle sensor configured to detect a steering angle that is a steering operation amount, a steering torque sensor configured to detect a steering torque, a turn signal switch (blinker switch) configured to detect an operating state of turn signals, and a shift position sensor configured to detect a shift lever position for a transmission.

The information obtained by the vehicle states sensor 70 and the driving operation states sensor 80 is referred to as sensor information, and is transmitted to the driving assist ECU 10 every time a predetermined time elapses.

The buzzer 90 is configured to generate sound in response to an instruction (activation instruction). The driving assist ECU 10 is configured to transmit the activation instruction to the buzzer 90 to let the buzzer 90 generate the sound, when the driving assist ECU 10 needs to alert the driver. This can alert the driver so as to call (draw) the driver's attention.

The brake ECU 20 is connected to a brake actuator 21. The brake actuator 21 is provided in an unillustrated hydraulic circuit between an unillustrated master cylinder and a friction brake mechanism 22 of each of wheels. The master cylinder pressurizes brake (working) fluid according to a brake pedal pressing force. The friction brake mechanism 22 comprises a brake disc 22a fixed to each of the wheels, and a brake caliper 22b fixed to the vehicle body. The brake actuator 21 is configured to vary/adjust oil pressure of the brake fluid applied to an unillustrated wheel cylinder in the brake caliper 22b in response to an instruction transmitted from the brake ECU 20. The wheel cylinder is operated by the oil pressure to press an unillustrated brake pad against the brake disc 22a so as to generate a frictional brake force.

The brake ECU 20 is configured to determine a driver request deceleration (or target driver requiring deceleration) based on the operation amount of the brake pedal detected by the brake operation amount sensor, and to control the brake actuator 21 in such a manner that the host vehicle decelerates at the driver request deceleration. Furthermore, the brake ECU 20 is configured to control the brake actuator 21 in such a manner that the host vehicle decelerates at a PCS request deceleration (or target PCS requiring deceleration), when the brake ECU 20 has received a "PCS brake instruction that contains the PCS request deceleration" transmitted from the driving assist ECU 10.

It should be noted that, when the brake pedal is operated/pressed while the brake ECU 20 has been receiving the PCS brake instruction, the brake ECU 20 adopts/employs, as a final requiring deceleration (or final target deceleration), one of the driver request deceleration and the PCS request deceleration, whichever its absolute value is greater. Namely, if the absolute value (magnitude) of the driver request deceleration is greater than the absolute value (magnitude) of the PCS request deceleration, the driver request deceleration is selected as the final requiring deceleration. Whereas, the absolute value (magnitude) of the PCS request deceleration is greater than the absolute value (magnitude) of the driver request deceleration, the PCS request deceleration is selected as the final requiring deceleration. The brake ECU 20 is configured to control the brake actuator 21 in such a manner that the host vehicle decelerates at the final requiring deceleration. In other words, the brake ECU 20 is configured to perform a so-called brake override control.

The engine ECU 30 is connected to an engine actuator 31. The engine actuator 31 is an actuator for changing an operation state of an internal combustion engine 32, and includes a throttle valve actuator for changing an opening degree of the throttle valve. The engine ECU 30 is configured to determine a driver requiring torque, and to control the engine actuator 31 in such a manner that the engine 32 outputs a torque equal to the driver requiring torque.

When the engine ECU 30 has received a driving force restriction instruction transmitted from the driving assist ECU 10, the engine ECU 30 controls the engine actuator 31 so as to impose a limitation on the torque generated/output by the engine 32. It should be noted that the engine actuator 31 may be a driving device for an electric motor, when the host vehicle is an electric vehicle. When the host vehicle is a hybrid vehicle, the engine actuator 31 may include the engine actuator 31 described above and the driving device for an electric motor.

The meter ECU 40 is connected with a display (or a display device) 41 and stop lamps 42. The meter ECU 40 is configured to display various information relating to driving assists on the display 41 in response to instructions transmitted from the driving assist ECU 10. The meter ECU 40 is configured to turn on the stop lamps in response to an instruction from the brake ECU 20.

<PCS Control>

The PCS control will next be described. The driving assist ECU 10 comprises a collision determination section 11, a notification section (alerting section) 12, an automatic brake control section 13, an acceleration override control section 14, a steering override control section 15, and a mistaken pedal operation determination section 16, in terms of its functions.

The collision determination section 11 determines whether or not the host vehicle is likely to collide with an 3D object that is present in front of (ahead of) the host vehicle, based on the front direction sensor information provided by the front direction sensor and the vehicle states detected by the vehicle states sensor 70. More specifically, the collision determination section 11 determines whether or not there is a probability that the host vehicle collides with the 3D obstacle, under the assumption that the host vehicle keeps its current running (traveling) state and the 3D object keeps its moving state (that may be a stopped state when the 3D object is a stationary object). The collision determination section 11 determines/regards the 3D object as an obstacle, when the collision determination section 11 determines that there is the probability of collision between the host vehicle and the 3D object. In this manner, it is said that the collision determination section 11 detects/recognizes the obstacle.

When the collision determination section 11 has detected/recognized the obstacle, the driving assist ECU 10 calculates (obtains through calculation) a time to collision TTC that is a predicted time length from a present time point to a collision time point of the collision between the host vehicle and the obstacle. The time to collision TTC is calculated based on the following equation (1) using a distance d between the host vehicle and the obstacle, and a relative speed Vr of the obstacle with respect to the host vehicle.

$$TTC = d/Vr \quad (1)$$

The time to collision TTC is used as an index value that is indicative of a possibility (degree) that the host vehicle collides with the obstacle (or indicative of imminency of the collision). The possibility that the host vehicle collides with the obstacle (i.e. the possibility of the collision) is higher as the time to collision TTC is smaller/shorter.

In the PCS control according to the present embodiment, the possibility of the collision is classified into two stages/levels (i.e., a first stage and a second stage) based on the time to collision TTC. In the first (initial) stage, the notification section 12 alerts the driver with the buzzer 90 and the display 41. In the second stage where the possibility of the collision is higher as compared to the first stage, the automatic brake control section 13 performs the automatic brake control so as to carry out the collision avoidance assist.

More specifically, the collision determination section 11 determines that the possibility of the collision between the host vehicle and the obstacle has reached the first stage, when the time to collision TTC has decreased to a threshold for alerting TTCw. The collision determination section 11 determines that the possibility of the collision between the host vehicle and the obstacle has reached the second stage, when the time to collision TTC has further decreased to a threshold for executing TTCa that is shorter/smaller than the threshold for alerting TTCw (i.e., TTCa<TTCw).

The automatic brake control section 13 transmits the PCS brake instruction, when it is determined that the possibility of the collision between the host vehicle and the obstacle has reached the second stage. The PCS brake instruction contains the information indicative of the PCS request deceleration Gpcs.

For instance, the PCS request deceleration Gpcs can be calculated as follows.

A moving distance X of the host vehicle in a period from the present time point to a time point at which the host vehicle stops is represented by the following equation (2), using the vehicle speed V at the present time point and a deceleration a of the host vehicle (a<0), and a time length t of the above period.

$$X = V \cdot t + (\tfrac{1}{2}) \cdot a \cdot t^2 \quad (2)$$

When the obstacle does not move, the vehicle speed V is equal to a relative speed between the host vehicle and the obstacle at the present time point.

The time length t of the period from the present time point to the time point at which the host vehicle stops is represented by the following equation (3)

$$t = -V/a \quad (3)$$

Therefore, the moving distance X of the host vehicle until it stops is represented by the following equation that is obtained by substituting the time length t expressed by the equation (3) into the equation (2).

$$X = -V^2/2a \quad (4)$$

In order to have the host vehicle stops at a position a distance β (β>0) before the obstacle, the moving distance X expressed in the equation (4) should be a distance (d−β) obtained by subtracting the distance β from the distance d that is detected by the front direction sensor at the present time point so as to obtain the deceleration a of the host vehicle. It should be noted that, if the obstacle is moving, the moving distance X is calculated by using the relative speed between the host vehicle and the obstacle, and the relative deceleration in place of the deceleration a.

The thus calculated deceleration "a" is used as the PCS request deceleration Gpcs. It should be noted that an upper limit Gmax (>0) is imposed on a magnitude of the PCS request deceleration Gpcs. Namely, if the magnitude of the calculated PCS request deceleration Gpcs is greater than the upper limit Gmax, the magnitude of the PCS request deceleration Gpcs is set to the upper limit Gmax.

When the brake ECU 20 has received the PCS brake instruction, the brake ECU 20 controls the brake actuator 21 in such a manner that the host vehicle decelerates at the PCS request deceleration Gpcs (i.e., in such a manner that an actual deceleration of the host vehicle coincides with the PCS request deceleration Gpcs). This can generate the frictional brake force in each of the wheels to let the host vehicle decelerate forcibly without driver's brake pedal operation.

The above described control to generate the frictional brake force in each of the wheels in response to the PCS brake instruction so as to decelerate the host vehicle is the automatic brake control.

The automatic brake control section 13 monitors (continuously determines) whether or not the time to collision TTC has become greater than an end threshold TTCb (TTC>TTCb). The end threshold TTCb is greater than the threshold for executing TTCa (TTCb>TTCa). Therefore, it can be said that the automatic brake control section 13 monitors (continuously determines) whether or not the possibility of the collision between the host vehicle and the obstacle becomes sufficiently low (in other words, whether or not the collision has been avoided). When the automatic brake control section 13 determines that the possibility of the collision between the host vehicle and the obstacle becomes sufficiently low, the automatic brake control section 13 stops transmitting the PCS brake instruction. This stops/ends the automatic brake control and the PCS control simultaneously.

Furthermore, the automatic brake control section 13 stops transmitting the PCS brake instruction when the host vehicle has stopped owing to the automatic brake control, as well. This stops/ends the automatic brake control. It should be noted that the automatic brake control section 13 transmits, to the brake ECU 20, a stop-state-hold instruction for a predetermined time (e.g. 2 seconds) after the host vehicle has stopped. In a period in which the brake ECU 20 receives the stop-state-hold instruction, the brake ECU 20 controls the brake actuator 21 to apply an oil pressure set for a stop-state-hold to the wheel cylinder in the friction brake mechanism 22 in each of the wheels. This keeps a stop state of the host vehicle (or keep the host vehicle in the stopped state) for the predetermined time. The PCS control ends after the stop state of the host vehicle is kept for the predetermined time. In addition, in the period in which the brake ECU 20 is executing the automatic brake control and is keeping the stop state of the host vehicle, the brake ECU 20 transmits a lighting instruction of the stop lamps to the meter ECU 40, so as to light the stop lamps.

In the period in which the automatic brake control section 13 is executing the automatic brake control and/or is keeping the stop state of the host vehicle, the automatic brake control section 13 transmits, to the engine ECU 30, the driving force restriction instruction for restricting the torque (or the engine output torque) generated by the engine 32 (e.g., for setting the engine output torque to zero). Therefore, the driver requiring torque is ignored even if the driver operates the acceleration pedal, while the automatic brake control is being executed. Thus, the host vehicle does not accelerate in response to the acceleration pedal operation (or the acceleration operation), while the automatic brake control is being executed.

Meanwhile, there may be a case where the driver operates the acceleration pedal to try to avoid the collision. In this case, if the automatic brake control is performed, the driver may not be able to let the host vehicle run at his/her intended vehicle speed. It should be noted that operating the acceleration pedal by the driver means performing the acceleration operation of the driver.

There may be another case where the driver steers the steering wheel to try to avoid the collision. In this case, if the automatic brake control is performed, the driver may not be able to let the host vehicle run along his/her intended path/route. It should be noted that steering the steering wheel by the driver means performing the steering operation of the driver.

In view of the above, when the driving assist ECU 10 determines that the possibility (or the probability) of the collision between the host vehicle and the obstacle has reached the second stage (i.e., when the time to collision TTC has been equal to or shorter than the threshold for executing TTCa), the driving assist ECU 10 can perform an acceleration override control that is a control to give priority to (or prioritize) the acceleration operation of the driver over the automatic brake control to prohibit the automatic brake control. This is implemented by an acceleration override control section 14 for executing the acceleration override control. Furthermore, when the driving assist ECU 10 determines that the possibility of the collision between the host vehicle and the obstacle has reached the second stage (i.e., when the time to collision TTC has been equal to or shorter than the threshold for executing TTCa), the driving assist ECU 10 can perform a steering override control to give priority to (or prioritize) the steering operation of the driver over the automatic brake control to prohibit the automatic brake control. This is implemented by a steering override control section 15 for executing the steering override control.

It should be noted that the "control to prohibit the automatic brake control" means a control to end the automatic brake control if the automatic brake control is being executed, and is also a control not to start the automatic brake control if the automatic brake control is not being executed (or has not been started yet).

The acceleration override control section 14 has stored a predetermined acceleration override condition (acceleration override determining condition), and is configured to determine whether or not the acceleration override condition is satisfied. The acceleration override control section 14 performs the acceleration override control when the acceleration override condition is (becomes) satisfied. In other words, the acceleration override control section 14 is configured to prohibit the automatic brake control section 13 from executing the automatic brake control, when an acceleration operation index value(s) indicative of (relating to) acceleration pedal operation of the driver satisfies the acceleration override condition.

The steering override control section 15 has stored a predetermined steering override condition (or steering override determining condition), and is configured to determine whether or not the steering override condition is satisfied. The steering override control section 15 performs the steering override control when the steering override condition is (becomes) satisfied. In other words, the steering override control section 15 is configured to prohibit the automatic brake control section 13 from executing the automatic brake control, when a steering operation index value(s) indicative of (relating to) steering operation of the driver satisfies the steering override condition.

Whereas, if the acceleration override control is performed when the driver has mistakenly pressed/operated the acceleration pedal strongly/rapidly despite that the driver intends to press/operate the brake pedal, the collision between the host vehicle and the obstacle may not be appropriately avoided. In view of this, the driving assist ECU 10 includes the mistaken pedal operation determination section 18 configured to determine whether or not the driver's mistaken pedal operation has occurred (i.e., whether or not the driver mistakenly operates/presses the acceleration pedal). As described above, the mistaken pedal operation is an operation that the driver mistakenly presses/operates the acceleration pedal instead of the brake pedal despite that the driver intends to press/operate the brake pedal.

The mistaken pedal operation determination section 16 has stored a predetermined mistaken pedal operation determination condition, and is configured to determine (or infer) that the driver's mistaken pedal operation has occurred when the mistaken pedal operation determination condition becomes satisfied. The mistaken pedal operation determination section 16 is configured to transmit a determination result (mistaken pedal operation determination result) as to (indicative of) whether or not the driver's mistaken pedal operation has occurred, to the automatic brake control section 13, the acceleration override control section 14, and the steering override control section 15.

The mistaken pedal operation determination section 16 is configured to determine whether or not the driver's mistaken pedal operation has occurred, based on conditions E1 to E3 described below. In other words, the mistaken pedal operation determination condition includes the conditions E1 to E3 described below, and is satisfied when all of the conditions E1 to E3 are satisfied.

Condition E1: To be satisfied when the present time point is within a predetermined threshold time (time length, e.g., 0.5 second) from a time point at which (a result of) an acceleration pedal operation rate determination (acceleration operation rate determination) turns to be (becomes) "ON". The acceleration pedal operation rate determination will be described later. In other words, the determination section 16 determines whether or not an elapsed time from the time point at which the acceleration pedal operation rate determination became "ON" is equal to or shorter than the threshold time.

Condition E2: To be satisfied when a value of an automatic brake execution determination flag F is "0".

Condition E3: To be satisfied when the acceleration pedal operation amount AP is equal to or greater than a threshold APa (i.e., AP≥APa). The threshold APa is larger than a threshold APb described later.

The mistaken pedal operation determination section 16 is configured to determine that the mistaken pedal operation has occurred when all of the conditions E1, E2, and E3 are satisfied. Hereinafter, the mistaken pedal operation determination result (the result of the mistaken pedal operation determination) that indicates that it has been determined that the mistaken pedal operation has occurred is expressed as "mistaken pedal operation determination: ON". Whereas, the mistaken pedal operation determination result that indicates that it has not been determined that the mistaken pedal operation has occurred is expressed as "mistaken pedal operation determination: OFF".

The acceleration pedal operation rate determination (or a result of the acceleration pedal operation rate determination) used in the condition E1 above is set to "ON" when all of the following operation rate determination conditions E1-1, E1-2, E1-3, and E1-4 are satisfied. In other words, the acceleration pedal operation rate determination remains "OFF" when at least one of the conditions E1-1, E1-2, E1-3, and E1-4 is not satisfied. The conditions E1-1, E1-2, E1-3, and E1-4 may be referred to as the operation rate determination conditions.

Condition E1-1: To be satisfied when the acceleration pedal operation amount AP is equal to or greater that the threshold APb (i.e., AP≥APb).

Condition E1-2: To be satisfied when an acceleration pedal operation rate APV is equal to or greater that a threshold APVc (i.e., APV≥APVc).

Condition E1-3: To be satisfied when a duration time Tboff that is a time length of a case where the brake switch continues being off is equal to or greater/longer that a threshold Tx (i.e., Tboff≥Tx).

Condition E1-4: To be satisfied when a duration time Twoff that is a time length of a case where the turn signal lamps continues being off is equal to or greater/longer that a threshold Ty (i.e., Twoff≥Ty).

The acceleration pedal operation amount AP means the operation amount of the acceleration pedal and is detected by the acceleration operation amount sensor. The acceleration pedal operation rate (or the change rate in the acceleration pedal operation amount) APV is an increasing/changing amount of the acceleration pedal operation amount AP per unit time.

The threshold APb is a threshold of the acceleration pedal operation amount for determining an occurrence of the mistaken pedal operation, and the threshold APVc is a threshold of the acceleration pedal operation rate for determining an occurrence of the mistaken pedal operation. Those thresholds have been set at values that are appropriate to detect the rapid/strong operation to the acceleration pedal. Therefore, the rapid/strong operation of the acceleration pedal by the driver can be detected by the conditions E1-1 and E1-2.

The conditions E1-3 is provided to determine whether or not the duration time Tboff of the state in which the driver has not operated the brake pedal since he/she operated the brake pedal last time is equal to or greater/longer than a lower limit that is the threshold Tx. For instance, if the driver does not operate the brake pedal for a long time period, there is a relatively high possibility that he/she does not correctly/properly distinguish between a position of the acceleration pedal and a position of the brake pedal. Therefore, it is more likely that the mistaken pedal operation has occurred (has been performed) when the conditions E1-1 and E1-2 become satisfied in a case where the driver has not operated the brake pedal for a long time period. This is the reason why the condition E1-3 is employed.

The conditions E1-4 is provided to determine whether or not the duration time Twoff of the state in which the turn signal lamps have not been activated is equal to or greater/longer that a lower limit that is the threshold Ty. For instance, in a period immediately after a time point (turn signal off time point) at which any of the right turn signal lamps and the left turn signal lamps, which have been activated (intermittently lighted), are turned off, there is a high possibility that the host vehicle is in the process of passing a preceding vehicle, or there is a high possibility that the host vehicle is running in a curved road. In these circumstances, the driver often operates/presses the acceleration pedal strongly/rapidly. Whereas, when the conditions E1-1 and E1-2 become satisfied after a relatively long time has passed since the turn signal off time point, it is more likely that the mistaken pedal operation has occurred (has been performed). This is the reason why the condition E1-4 is employed.

The condition E2 is a condition to be satisfied when the automatic brake control is not being executed by the automatic brake control section 13. The automatic brake control section 13 outputs the value of the automatic brake execution determination flag F that is indicative of whether or not it is performing the automatic brake control. The automatic brake execution determination flag F indicates that the automatic brake control is not being executed when the value of the flag F is "0". The automatic brake execution determination flag F indicates that the automatic brake control is being executed when the value of the flag F is "1". The mistaken pedal operation determination section 16 determines whether or not the automatic brake control is being executed based on (by reading/referring to) the value of the automatic brake execution determination flag F.

The condition E3 (together with the condition E1) is a condition to determine whether or not the acceleration pedal operation amount AP has reached (further increased to be) a value equal to or greater than the threshold APa within a predetermined time from a time point at which the acceleration pedal operation rate determination (result) turned to be "ON". When the driver has performed the mistaken pedal operation, the acceleration pedal operation amount AP continues increasing even after the acceleration pedal operation rate APV reached the value equal to or greater than the threshold APVc (i.e., after the condition E1-2 became satisfied). The reason for this is that the driver is likely to be in panic mode and to press strongly/rapidly the acceleration pedal. This is why the condition E3 is employed to determine whether or not the acceleration pedal operation amount AP is equal to or greater than the threshold APa that has been set to the value larger than the threshold APb.

The mistaken pedal operation determination section 16 holds its determination result indicative of the occurrence of the mistaken pedal operation once the mistaken pedal operation determination section 16 determines that the mistaken pedal operation has occurred, until it is detected that the acceleration pedal is released or returned (i.e., until a returning operation of the acceleration pedal, or a returning acceleration operation is detected). For example, the mistaken pedal operation determination section 16 returns the mistaken pedal operation determination result to the "mistaken pedal operation determination: OFF" when the mistaken pedal operation determination section 16 detects that the acceleration pedal operation amount AP has decreased to a value equal to or smaller than a returning acceleration operation determining threshold APend (e.g., 10% of fully opened amount of the acceleration pedal operation amount).

<Mistaken Pedal Operation Determination Routine>

Figure 3:
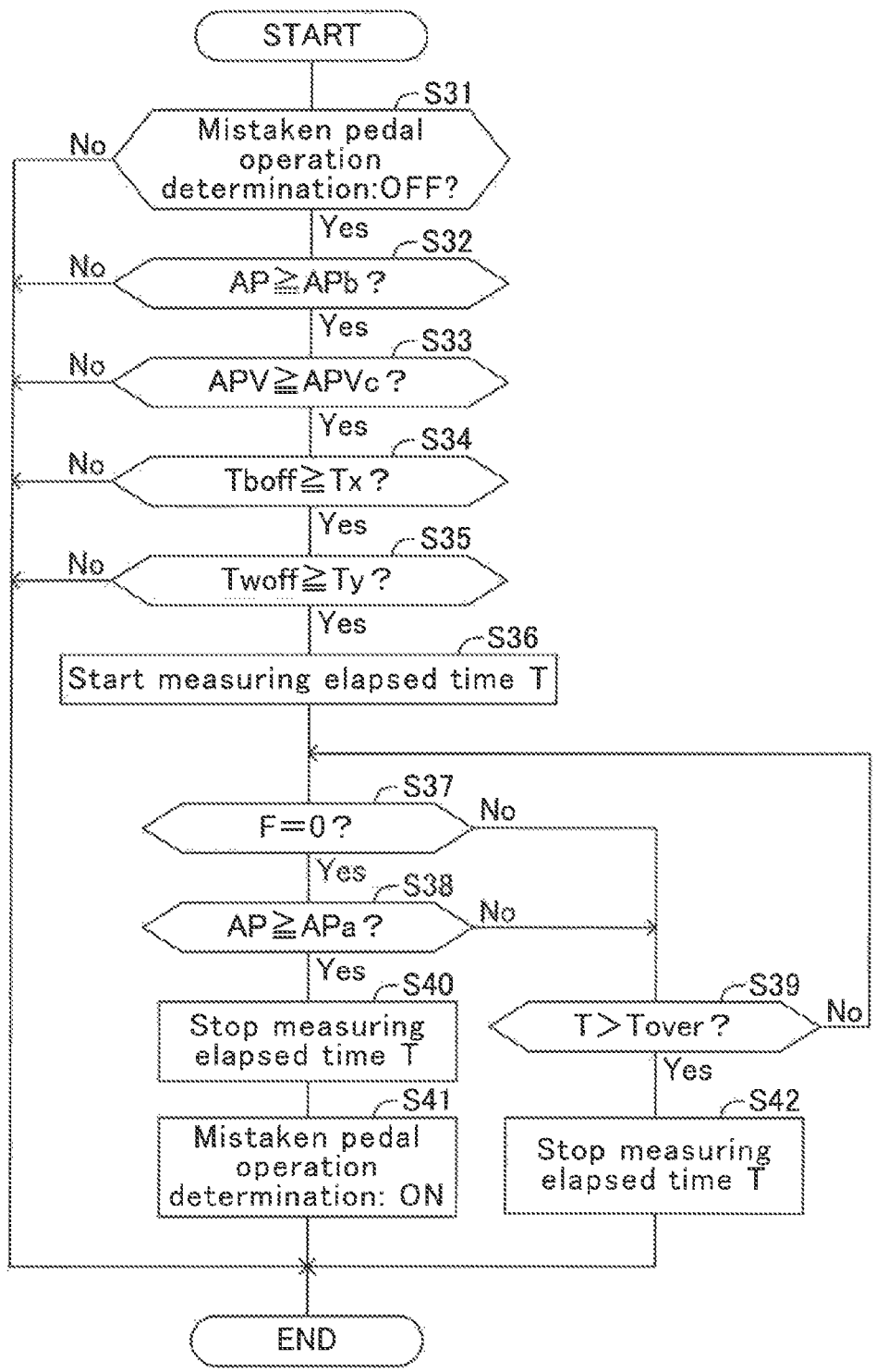
FIG. 3 is a flowchart representing a mistaken pedal operation determination routine.

FIG. 3 illustrates a flowchart describing a mistaken pedal operation determination routine that specifically shows processes carried out by the above described mistaken pedal operation determination section 16. The mistaken pedal operation determination section 16 executes the mistaken pedal operation determination routine every time a predetermined time elapses.

At step S31, the determination section 16 determines whether or not the mistaken pedal operation determination result is "the mistaken pedal operation determination: OFF", and executes processes of step S32 and following steps when the mistaken pedal operation determination result is "the mistaken pedal operation determination: OFF". The mistaken pedal operation determination result is initially set at "the mistaken pedal operation determination: OFF".

The determination section 16 determines whether or not the above described conditions E1-1, E1-2, E1-3, and E1-4 are satisfied through steps S32-S35, respectively. Namely, the process of step S32 is for determining whether or not the condition E1-1 is satisfied. The process of step S33 is for determining whether or not the condition E1-2 is satisfied. The process of step S34 is for determining whether or not the condition E1-3 is satisfied. The process of step S35 is for determining whether or not the condition E1-4 is satisfied.

The determination section 16 ends the mistaken pedal operation determination routine tentatively, when at least one of conditions E1-1, E1-2, E1-3, and E1-4 is not satisfied. When all of the conditions E1-1, E1-2, E1-3, and E1-4 are satisfied, the determination section 16 proceeds to step S36 so as to start measuring an elapsed time T using a timer.

Subsequently, at step S37, the determination section 16 determines whether or not the value of the automatic brake execution determination flag F is "0" (refer to the condition E2). When the automatic brake execution determination flag F is "0", the determination section 16 determines whether or not the acceleration pedal operation amount AP is equal to or greater that the threshold APa (refer to the condition E3) at step S38.

When at least one of the determination results at step S37 and step S38 is "No", the determination section 16 proceeds to step S39 so as to determine whether or not the elapsed time T measured by the timer is greater than a predetermined set time Tover (e.g., 0.5 second). As long as the elapsed time T is equal to or smaller than the predetermined set time Tover, the determination section 16 returns to step S37, and repeats the processes of step S37 to S39.

If both of the condition E2 and the condition E3 become satisfied (S37: Yes, S38: Yes) before the elapsed time T reaches the set time Tover, the determination section 16 stops measuring the elapsed time T at step S40. Thereafter, the determination section 16 sets the mistaken pedal operation determination result to "the mistaken pedal operation determination: ON" at step S41, and thereafter, ends the mistaken pedal operation determination routine.

In contrast, when the elapsed time T becomes greater than the set time Tover before both of the condition E2 and the condition E3 become satisfied (S39: Yes), the determination section 16 stops measuring the elapsed time T at step S42, and thereafter, ends the mistaken pedal operation determination routine.

<Mistaken Pedal Operation Determination (Result) Canceling Routine>

Figure 4:
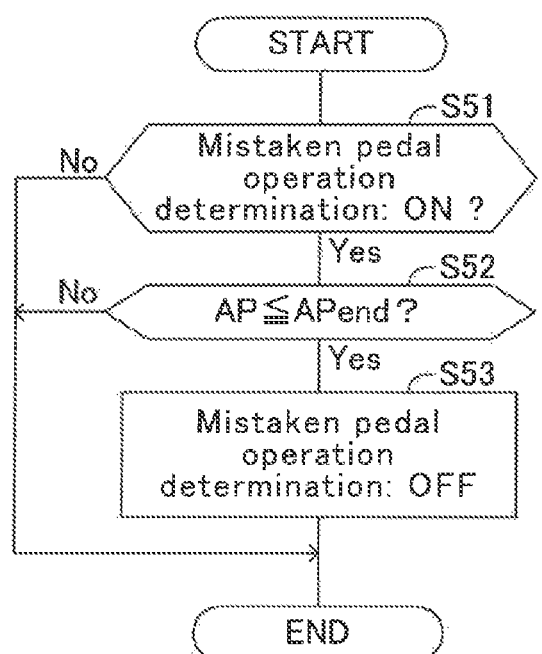
FIG. 4 is a flowchart representing a mistaken pedal operation determination canceling routine.

The determination section 16 executes a mistaken pedal operation determination canceling routine shown in FIG. 4 so as to execute processes for returning the mistaken pedal operation determination result to "the mistaken pedal operation determination: OFF" from "the mistaken pedal operation determination: ON". The mistaken pedal operation determination canceling routine is executed every time the predetermined time elapses in parallel with the mistaken pedal operation determination routine shown in FIG. 3.

After the determination section 16 has started the mistaken pedal operation determination canceling routine, the determination section 16 determines whether or not the mistaken pedal operation determination result is "the mistaken pedal operation determination: ON" at step S51. If the mistaken pedal operation determination result is "the mistaken pedal operation determination: OFF", the determination section 16 ends the mistaken pedal operation determination canceling routine tentatively. Whereas, if the mistaken pedal operation determination result is "the mistaken pedal operation determination: ON", the determination section 16 determines whether or not a mistaken pedal operation determination end condition becomes satisfied at step 25. In this example, the determination section 16 determines whether or not the acceleration pedal operation amount AP has decreased to the value equal to or smaller than the returning acceleration operation determining threshold APend (e.g., 10% of the fully opened amount of the acceleration pedal operation amount). If the acceleration pedal operation amount AP has not decreased to the value equal to or smaller than the returning acceleration operation determining threshold APend, the determination section 16 ends the mistaken pedal operation determination canceling routine tentatively. When the determination section 16 determines that the acceleration pedal operation amount AP has decreased to the value equal to or smaller than the returning acceleration operation determining threshold APend (S52: Yes), the determination section 16 returns the mistaken pedal operation determination result to "the mistaken pedal operation determination: OFF", and thereafter, ends the mistaken pedal operation determination canceling routine.

<Acceleration Override Control>

The acceleration override control section 14 will next be described. The acceleration override control section 14 does not execute the acceleration override control when the mistaken pedal operation determination result obtained by the mistaken pedal operation determination section 16 is "the mistaken pedal operation determination: ON". The acceleration override control section 14 executes the acceleration override control (and thus, prohibits the automatic brake control section 13 from executing the automatic brake control), when the mistaken pedal operation determination result obtained by the mistaken pedal operation determination section 16 is "the mistaken pedal operation determination: OFF" and the acceleration override condition becomes satisfied.

The acceleration override control section 14 has stored the following conditions AOR1 and AOR2, and determines that the acceleration override condition becomes satisfied when at least one of the conditions AOR1 and AOR2 becomes satisfied.

Condition AOR1: To be satisfied when the acceleration pedal operation amount AP is greater than the threshold APa (i.e., AP>APa)

Condition AOR2: To be satisfied when the acceleration pedal operation amount AP is greater than the threshold APb (i.e., AP>APb) and the acceleration pedal operation rate APV is greater than a threshold APVd (i.e., APV>APVd>APVc).

The threshold APa, the threshold APb, and the threshold APVd have been determined in consideration of "a certain acceleration pedal operation amount and a certain acceleration pedal operation rate" of when the acceleration (pedal) operation of the driver should be given priority over the automatic brake control. In the present embodiment, the threshold APVd is greater than the threshold APVc.

When at least one of the conditions AOR1 and AOR2 becomes satisfied, the acceleration override control section 14 sets an acceleration override determination result to "the acceleration override determination result: ON". In contrast, when neither the condition AOR1 nor the condition AOR2 becomes satisfied, the acceleration override control section 14 sets the acceleration override determination result to "the acceleration override determination result: OFF".

<Steering Override Control>

The steering override control section 15 utilizes/makes a first steering override determination and a second steering override determination so as to determine whether to execute the steering override control (and thus, whether to prohibit the automatic brake control section 13 from executing the automatic brake control).

A condition for using the first steering override determination and a condition for using the second steering override determination will be described later, when an automatic brake allowance/prohibiting switching control routine is described.

The steering override control section 15 makes the first steering override determination based on the conditions/ requirements SOR1-1 and SOR1-2 described below.

Condition SOR1-1: To be satisfied when the steering operation amount $\theta$ that is (a magnitude of) the steering angle is greater than a threshold $\theta e$ (i.e., $\theta > \theta e$).

Condition SOR1-2: To be satisfied when (a magnitude of) a steering operation rate $\omega$ (=d$\theta$/dt) is greater than a threshold $\omega f$ (i.e., $\omega > \omega f$).

The steering operation amount $\theta$ is the magnitude of the steering angle detected by the steering angle sensor. In other words, the steering operation amount $\theta$ used in the steering override determinations becomes greater as the steering wheel is rotated more from its neutral position regardless of a rotation direction (clockwise or counterclockwise) of the steering wheel. The steering operation rate $\omega$ used in the steering override determinations is an absolute value of a change amount in the steering operation amount $\theta$ used in the steering override determinations per unit time. The steering operation amount $\theta$ and the steering operation rate $\omega$ are steering operation index values indicative of (relating to) steering operation of the driver.

The threshold $\theta e$ and the threshold $\omega f$ have been determined in consideration of "a certain steering operation amount and a certain steering operation rate" of when the steering operation of the driver should be given priority over the automatic brake control.

When at least one of the condition SOR1-1 and the condition SOR1-2 becomes satisfied, the steering override control section 15 sets a first steering override determination result to a "first steering override determination result: ON". In contrast, when neither the condition SOR1 nor the condition SOR2 is satisfied, the steering override control section 15 keeps the first steering override determination result at a "first steering override determination result: OFF".

The steering override control section 15 makes the second steering override determination based on the condition/ requirement SOR2 described below.

Condition SOR2: To be satisfied when (the magnitude of) the steering operation rate $\omega$ (=d$\theta$/dt) is greater than the threshold $\omega f$ (i.e., $\omega > \omega f$).

The condition SOR2 is the same as the condition SOR1-2 described above.

Therefore, the second steering override determination is made based on the conditions that the first steering override determination uses except the condition SOR1-1. Thus, the second steering override determination is harder (more difficult, more unlikely) to be satisfied than the first steering override determination, based on (by) the steering operation index values.

When the condition SOR2 becomes satisfied, the steering override control section 15 sets a second steering override determination result to a "second steering override determination result: ON". In contrast, when the condition SOR2 is not satisfied, the steering override control section 15 keeps the second steering override determination result at a "second steering override determination result: OFF".

The steering override control section 15 executes the steering override control, when the steering override control section 15 sets the first steering override determination result to the "first steering override determination result: ON" (and thus, prohibits the automatic brake control section 13 from executing the automatic brake control). Similarly, the steering override control section 15 also executes the steering override control (and thus, prohibits the automatic brake control section 13 from executing the automatic brake control), when the steering override control section 15 sets the second steering override determination result to the "second steering override determination result: ON".

<Automatic Brake Allowance/Prohibiting Switching Control Routine>

Figure 2:
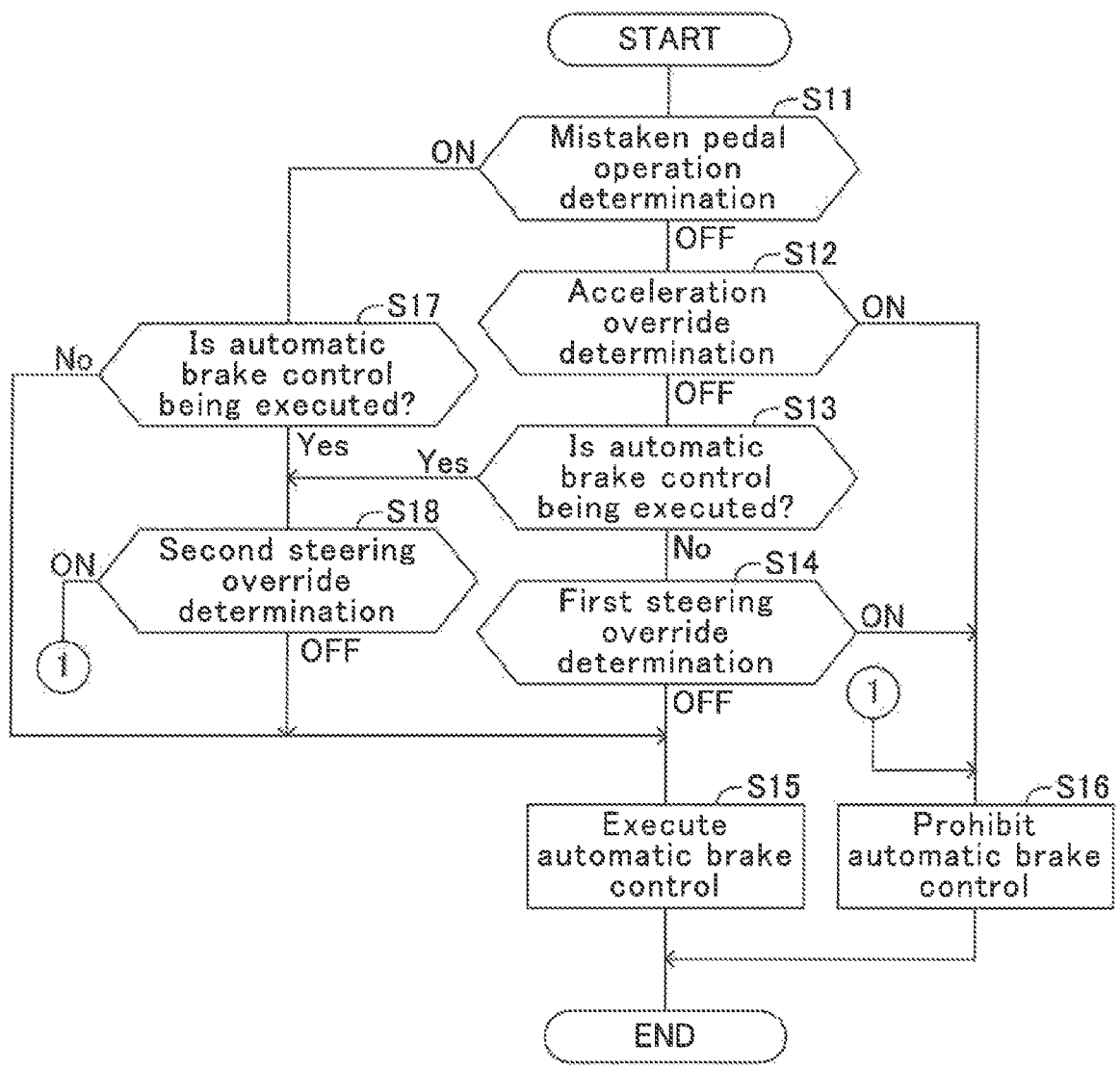
FIG. 2 is a flowchart representing an automatic brake allowance/prohibiting switching control routine.

Specific processes for an automatic brake allowance/ prohibiting switching executed by the driving assist ECU 10 will next be described. FIG. 2 shows an automatic brake allowance/prohibiting switching control routine executed by the driving assist ECU 10. Hereinafter, the automatic brake allowance/prohibiting switching control routine may be simply referred to as a switching control routine. The switching control routine is executed by the automatic brake control section 13.

The switching control routine is executed repeatedly in a period (referred to as an "execution period") from a time point at which an execution start condition described below becomes satisfied to a time point at which an execution end condition described below becomes satisfied, every time a predetermined time elapses.

The execution start condition is a condition to be satisfied when it is determined that the host vehicle has a high possibility (probability) of colliding with the obstacle (namely, when the time to collision TTC has reached (or decreased to) a value equal to or smaller than the threshold for executing TTCa). It should be noted, as described later, that, when and after any one of the override controls (i.e., the acceleration override control and the steering override control) prohibits the automatic brake control from being executed, the execution start condition continues to be unsatisfied until the time to collision TTC for an obstacle that is different from the obstacle of when the automatic brake control is prohibited has reached (or decreased to) the value equal to or smaller than the threshold for executing TTCa.

The execution end condition is satisfied at a first time point and a second time point, whichever comes earlier. The first time point is a time point at which the collision between the host vehicle and the obstacle has been avoided (namely, when the time to collision TTC has become greater than the end threshold TTCb). The second time point is a time point at which it is determined that the host vehicle has stopped (due to the automatic brake control). The execution end condition is also satisfied when any of the override controls has prohibited the automatic brake control from being executed.

When the driving assist ECU 10 starts the switching control routine, it executes the process for a mistaken pedal operation determination at step S11. The process for the mistaken pedal operation determination is a process to determine whether or not it has been inferred/determined that the driver's mistaken pedal operation has occurred. More specifically, the driving assist ECU 10 makes the mistaken pedal operation determination by reading out (fetching) the mistaken pedal operation determination result obtained by the mistaken pedal operation determination section 16. The driving assist ECU 10 proceeds to step S12 when the mistaken pedal operation determination result is "the mistaken pedal operation determination: OFF". Whereas, the driving assist ECU 10 proceeds to step S17 when the mistaken pedal operation determination result is "the mistaken pedal operation determination: ON".

The description will be firstly made for the case where the mistaken pedal operation determination result is "the mistaken pedal operation determination: OFF".

When it has not been inferred/determined that the driver's mistaken pedal operation has occurred, the driving assist ECU 10 reads out the acceleration override determination result obtained by the acceleration override control section 14 and determines whether the acceleration override determination result is "the acceleration override determination result: ON" or "the acceleration override determination result: OFF", at step S12.

When the acceleration override determination result is "the acceleration override determination result: OFF", the driving assist ECU 10 determines whether or not the automatic brake control is being executed, at step S13. More specifically, the driving assist ECU 10 reads out the value of the automatic brake execution determination flag F and determines whether or not the value of the automatic brake execution determination flag F is "1".

When the automatic brake control is not being executed (i.e., when the value of the automatic brake execution determination flag F is "0"), the driving assist ECU 10 proceeds at step S14. At step S14, the driving assist ECU 10 reads out the determination result of the first steering override determination made by the steering override control section 15 and determines whether the determination result of the first steering override determination is "the first steering override determination result: ON" or "the first steering override determination result: OFF".

When the determination result of the first steering override determination is "the first steering override determination result: OFF", the driving assist ECU 10 determines that the driver's collision avoidance operation (driving operation) has not been performed, and proceeds to step S15.

At step S15, the driving assist ECU 10 executes the automatic brake control. In this case, since the automatic brake control has not been started, the automatic brake control is started. After the driving assist ECU 10 starts the automatic brake control, the driving assist ECU 10 ends the switching control routine tentatively, and restarts the switching control routine unless the execution end condition becomes satisfied. When the automatic brake control is started, the value of the automatic brake execution determination flag F is changed from "0" to "1".

The above processes are repeated if neither the driver's mistaken pedal operation nor the driver's collision avoidance operation for avoiding the collision (i.e., the acceleration operation for avoiding the collision and/or the steering operation for avoiding the collision) is detected, so that the brake force continues being applied to the vehicle due to the execution of the automatic brake control. In this case, the execution end condition becomes satisfied, when it is determined that the collision between the host vehicle and the obstacle has been avoided (namely, when the time to collision TTC has become greater than the end threshold TTCb) while the driver's collision avoidance operation is not detected, or when it is determined that the host vehicle has stopped (due to the automatic brake control) while the driver's collision avoidance operation is not detected. When the execution end condition becomes satisfied, the switching control routine is ended (is no longer repeated).

Whereas, at step S12, if it is determined that the acceleration override determination result is "the acceleration override determination result: ON" (that is, when it is determined that the acceleration (pedal) operation of the driver for avoiding the collision is being performed), the driving assist ECU 10 proceeds to step S16.

At step S16, the driving assist ECU 10 prohibits the automatic brake control. Namely, if the driving assist ECU 10 has already started the automatic brake control, the driving assist ECU 10 ends the automatic brake control at step S16. Whereas, if the driving assist ECU 10 has not started the automatic brake control yet, the driving assist ECU 10 holds/keeps a state where the automatic brake control is not executed, at step S16.

When the driving assist ECU 10 ends the automatic brake control at step S16, the driving assist ECU 10 ends (no longer repeats) switching control routine. In this case, the switching control routine is not started until a new obstacle that is different from the obstacle that has been currently recognized is detected.

In addition, when the first steering override determination result is "the first steering override determination result: ON" (S14: Yes) before the automatic brake control is started (S13: No), the driving assist ECU 10 also proceeds to step S16 so as to prohibit the automatic brake control. As described above, the first steering override determination result becomes "the first steering override determination result: ON", when (the magnitude) the steering operation amount θ is greater than the threshold θe or when (the magnitude) the steering operation rate ω is greater than the threshold ωf.

In this manner, when a steering operation condition that makes the first steering override determination result be "the first steering override determination result: ON" has been satisfied while the mistaken pedal operation has not been detected, it can be inferred/considered that the steering operation of the driver for avoiding the collision is being performed before the automatic brake control is started. In view of this, the driving assist ECU 10 prohibits the automatic brake control when the first steering override determination result is the "first steering override determination result: ON". When the automatic brake control is prohibited, the automatic brake control continues to be prohibited until a new obstacle that is different from the obstacle that has been currently recognized is detected.

In contrast, if the automatic brake control is being executed (S13: Yes), the driving assist ECU 10 proceeds to step S18. At step 18, the driving assist ECU 10 reads out the determination result of the second steering override determination made by the steering override control section 15 and determines whether the determination result of the second steering override determination is "the second steering override determination result: ON" or "the second steering override determination result: OFF". Namely, the driving assist ECU 10 determines whether or not (the magnitude of) the steering operation rate ω is greater than the threshold ωf (ω>ωf).

When the determination result of the second steering override determination is "the second steering override determination result: ON" (S18: ON), it can be inferred that the steering operation of the driver for avoiding the collision is started after the automatic brake control is started. In this case, the driving assist ECU 10 proceeds to step S16 so as to prohibit the automatic brake control (i.e., ends/stops the automatic brake control). In contrast, when the determination result of the second steering override determination is "the second steering override determination result: OFF" (S18: OFF), it can be inferred that the steering operation of the driver for avoiding the collision has not been performed. Thus, in this case, the driving assist ECU 10 proceeds to step S15. Consequently, the automatic brake control continues being executed.

The description will next be made for the case where the mistaken pedal operation determination result is "the mistaken pedal operation determination: ON".

When it is determined/inferred that the driver's mistaken pedal operation has occurred, the driving assist ECU 10 proceeds to step S17 from step S11 and determines whether or not the automatic brake control is being executed. More specifically, the driving assist ECU 10 reads out the value of the automatic brake execution determination flag F and determines whether or not the value of the automatic brake execution determination flag F is "1".

When the automatic brake control is not being executed, the driving assist ECU 10 proceeds to step S15 so as to execute the automatic brake control. Therefore, when the mistaken pedal operation has been detected (or is determined to be occurred), the automatic brake control is always started.

In contrast, when the automatic brake control is being executed, the driving assist ECU 10 proceeds to step S18 from step S17. At step S18, the driving assist ECU 10 reads out the determination result of the second steering override determination made by the steering override control section 15 and determines whether the determination result of the second steering override determination is "the second steering override determination result: ON" or "the second steering override determination result: OFF". Namely, the driving assist ECU 10 determines whether or not (the magnitude of) the steering operation rate ω is greater than the threshold ωf (ω>ωf).

When the determination result of the second steering override determination is "the second steering override determination result: OFF" (S18: OFF), the driving assist ECU 10 proceeds to step S15 so as to execute the automatic brake control. In this case, the automatic brake control continues being executed.

Whereas, when the determination result of the second steering override determination is "the second steering override determination result: ON" (S18: ON), it can be inferred/considered that the driver steers the steering wheel while he/she is pressing strongly/rapidly the acceleration pedal with his/her intention in order to avoid the collision. In view of this, in this case, the driving assist ECU 10 proceeds to step S16 from step S18 so as to prohibit the automatic brake control. Therefore, at this point in time, the automatic brake control is ended.

As has been described, according to the collision avoidance assist control apparatus of the embodiment of the present disclosure, the automatic brake control is prohibited due to (by) the steering override control when the determination result of the second steering override determination is "the second steering override determination result: ON" even if it has been determined that the driver's mistaken pedal operation has occurred, in the case where the host vehicle has a high probability (probability) of colliding with the obstacle. Accordingly, when the driver performs the collision avoidance operation that he/she steers the steering wheel while he/she is pressing strongly/rapidly the acceleration pedal with his/her intention in order to avoid the collision, the collision avoidance operation by the driver is not interfered (by the automatic brake control). Consequently, the driver can let the host vehicle run along his/her intended path/route.

Figure 5:
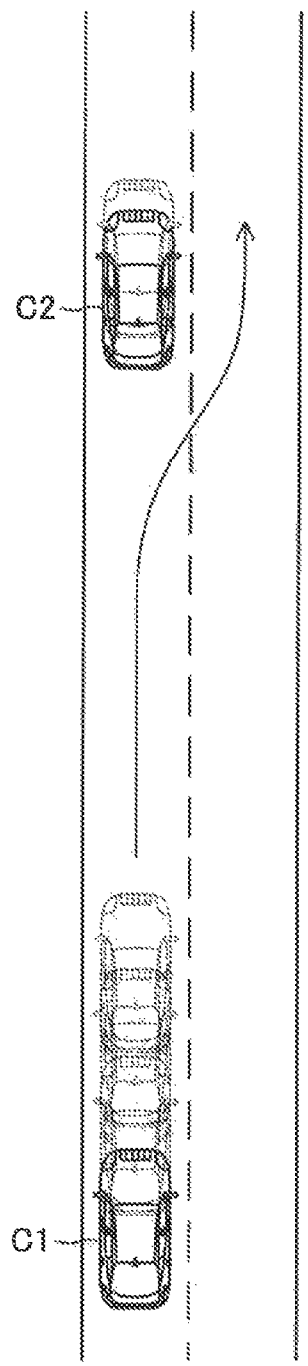
FIG. 5 is a plan view of the host vehicle that is about to come closer to and pass a preceding vehicle.

For example, as shown in FIG. 5, the preceding vehicle C2 may be determined to be the obstacle, since the host vehicle C1 rapidly approaches (comes closer to) the preceding vehicle C2 when the driver of the host vehicle tries to pass the preceding vehicle C2 and accelerates the host vehicle. In this case, the conventional apparatus continues the automatic brake control regardless of the steering state, if it determines that the rapid acceleration operation of the driver is the mistaken pedal operation. In contrast, the collision avoidance assist control apparatus according to the embodiment of the present disclosure changes the determination result of the second steering override determination to "the second steering override determination result: ON" immediately after the driver steers/rotates the steering wheel, and therefore, ends the automatic brake control right away (although, the automatic brake control is executed temporarily for one calculation cycle, refer to S17 and S18, the process at step S17 is just executed only once, but the one calculation cycle later, the the ECU 10 proceeds to step S18 from step S17, and then proceeds to step S16). Consequently, the driver can let the host vehicle run along his/her intended path/route.

In addition, in the above embodiment, the steering override condition used when it is determined that the mistaken pedal operation has occurred is different from the steering override condition used when it is not determined that the mistaken pedal operation has occurred. More specifically, as compared with the steering override condition (i.e., the first steering override determining condition) used when it is not determined that the mistaken pedal operation has occurred, the steering override condition (i.e., the second steering override determining condition) used when it is determined that the mistaken pedal operation has occurred is set in such a manner that the automatic brake control is more unlikely (or is harder) to be prohibited in the case where the automatic brake control is not being executed.

For example, if it is not determined/inferred that the mistaken pedal operation has occurred, the automatic brake control is prohibited from starting (i.e., the steering override control is executed) in any one of the case where the steering operation amount θ is greater than the threshold θe and the case where the steering operation rate ω is greater than the threshold ωf.

Whereas, if it is determined/inferred that the mistaken pedal operation has occurred, the automatic brake control is not prohibited (i.e., the automatic brake control is executed) when the steering operation rate ω is not greater than the threshold ωf even if the steering operation amount θ is greater than the threshold θe. This is because, there is a possibility that driver is in panic mode to hold the steering wheel at a greatest steering operation amount in the case where it is determined/inferred that the mistaken pedal operation has occurred. In such a case, if the automatic brake control is prohibited, the collision with the obstacle may not be avoided. Since it is not appropriate to infer that the driver is performing the collision avoidance operation with his/her intention unless the steering wheel is rotated at a high speed, the present embodiment executes the automatic brake control. Consequently, the collision with the obstacle can be avoided.

In the above manner, the present embodiment can appropriately execute the steering override control when the mistaken pedal operation is performed.

The collision avoidance assist control apparatus according to the embodiment of the present disclosure has been described. The present disclosure should not be limited to the embodiment, and can adopt various modifications without departing from the present disclosure.

For example, the conditions E1 to E3 are used to determine whether or not the mistaken pedal operation has occurred in the embodiment, however, different conditions may be used to determine whether or not the mistaken pedal operation has occurred. For example, the mistaken pedal operation determination section may be configured to determine that the mistaken pedal operation has occurred at least two of the conditions are satisfied, one being the condition to be satisfied when the acceleration pedal operation amount AP is equal to or larger than the threshold APb (AP≥APb). and the other being the condition to be satisfied when the acceleration pedal operation rate APV is equal to or larger than a threshold APVc (APV≥APVc).

For instance, the condition E1 may be a condition to be satisfied when only the condition (acceleration pedal operation rate determination condition) E1-2 is satisfied, regardless of the conditions E1-1, E1-3, and E1-4. Furthermore, the condition E1 may be a condition to be satisfied as long as the both of the conditions (acceleration pedal operation rate determination conditions) E1-2 and E1-1 are satisfied.

What is claimed is:

1. A collision avoidance assist control apparatus comprising:
a brake device configured to generate brake force applied to a host vehicle in accordance with a brake pedal operation of a driver;
a surrounding area detection sensor configured to obtain information on an object that is present around said host vehicle; and
a control unit configured to:
determine whether or not there is a probability of a collision between said host vehicle and an object based on said information obtained by said surrounding area detection sensor;
perform an automatic brake control to let said brake device generate said brake force applied to said host vehicle without requiring said brake pedal operation of said driver so as to avoid said collision, when it is determined that there is said probability; and
perform a steering override control to determine whether or not a steering operation index value indicative of steering operation of said driver satisfies a steering override condition, and to prohibit said automatic brake control from being performed when it is determined that said steering operation index value satisfies said steering override condition,
wherein,
said control unit is configured to:
determine whether or not an acceleration operation index value indicative of acceleration pedal operation of said driver satisfies a mistaken pedal operation determining condition;
determine that a mistaken pedal operation has occurred when it is determined that said acceleration operation index value satisfies said mistaken pedal operation determining condition, said mistaken pedal operation being an operation that said driver mistakenly operates an acceleration pedal despite that said driver intends to operate a brake pedal; and
use a strict requirement as said steering override condition when it is determined that said mistaken pedal operation has occurred, and use a mild requirement as said steering override condition when it is not determined that said mistaken pedal operation has occurred, said strict requirement being harder to be satisfied by said steering operation index value than said mild requirement,
wherein,
said control unit is configured to:
use a first steering override determining condition as said steering override condition when said automatic brake control has not been started yet, in a state where it is not determined that said mistaken pedal operation has occurred, so as to perform said steering override control;
use a second steering override determining condition as said steering override condition when said automatic brake control has already started, in said state where it is not determined that said mistaken pedal operation has occurred, so as to perform said steering override control;

be unable to perform said steering override control when said automatic brake control has not been started yet, in a state where it is determined that said mistaken pedal operation has occurred; and use said second steering override determining condition as said steering override condition when said automatic brake control has already been started, in said state where it is determined that said mistaken pedal operation has occurred, so as to perform said steering override control.

2. The collision avoidance assist control apparatus according to claim 1, wherein, said control unit is configured to:

determine that said first steering override determining condition is satisfied, when one of a condition that a steering operation amount which is said steering operation index value is greater than a steering operation amount threshold and a condition that a steering operation rate which is also said steering operation index value is greater than a steering operation rate threshold is satisfied; and determine that said second steering override determining condition is satisfied when said condition that said steering operation rate is greater than said steering operation rate threshold is satisfied, and determine that said second steering override determining condition is not satisfied even when said condition that said steering operation amount is greater than said steering operation amount threshold is satisfied unless said condition that said steering operation rate is greater than said steering operation rate threshold is satisfied.

* * * * *